(12) United States Patent
Griffith et al.

(10) Patent No.: US 6,401,170 B1
(45) Date of Patent: Jun. 4, 2002

(54) RAID SYSTEMS DURING NON-FAULT AND FAULTY CONDITIONS ON A FIBER CHANNEL ARBITRATED LOOP, SCSI BUS OR SWITCH FABRIC CONFIGURATION

(75) Inventors: Geoffrey J. Griffith, Laurel; Tomlinson G. Rauscher, Ellicott City, both of MD (US)

(73) Assignee: Digi-Data Corporation, Jessup, MD (US)

( * ) Notice: Subject to any disclaimer, the term of this patent is extended or adjusted under 35 U.S.C. 154(b) by 0 days.

(21) Appl. No.: 09/376,324

(22) Filed: Aug. 18, 1999

(51) Int. Cl.[7] .............................................. G06F 12/00
(52) U.S. Cl. ........................ 711/114; 711/150; 711/156; 711/162
(58) Field of Search ................................. 711/114, 150, 711/156, 162, 163; 714/5, 6; 370/222, 258; 710/37

(56) References Cited

U.S. PATENT DOCUMENTS 6,006,342 A * 12/1999 Beardsley et al. .............. 714/5
6,055,228 A * 4/2000 DeKoning et al. ........... 370/258
6,073,218 A * 6/2000 DeKoning et al. ........... 711/150
6,131,148 A * 10/2000 West et al. ................... 711/162
6,151,659 A * 11/2000 Solomon et al. ............. 711/114
6,192,027 B1 * 2/2001 El-Batal ....................... 370/222
6,192,484 B1 * 2/2001 Asano ............................. 714/6

* cited by examiner

Primary Examiner—David Hudspeth
Assistant Examiner—Fred F. Tzeng
(74) Attorney, Agent, or Firm—William S. Ramsey

(57) ABSTRACT

The RAID system disclosed here uses arbitrated fiber channels or switch fabric to connect multiple host computers and storage array controllers (SAC). Each SAC is designated a primary SAC for an array of storage units, which it normally serves as controller, and as a secondary SAC for another array of storage units. A primary SAC, secondary SAC, and array of storage units is termed a storage unit set. When the primary SAC or associated host computer fails, the failure is detected by an interface chip, which causes the secondary SAC to assume the identify of the primary controller. Using system configuration information from the DASDs, the secondary SAC then controls the storage units of the storage unit set along with the storage units of which it is primary SAC. With this configuration, there is no need for switch apparatus between the storage arrays and there is no interference because dual ported storage units are used.

11 Claims, 6 Drawing Sheets

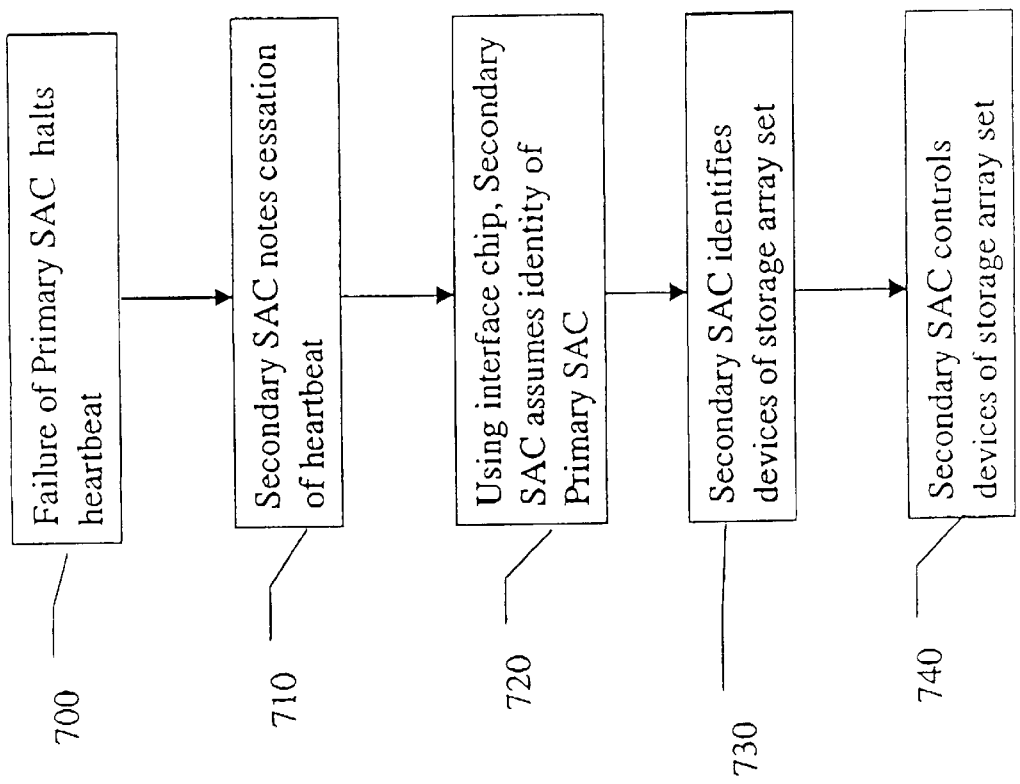

RAID SYSTEMS DURING NON-FAULT AND FAULTY CONDITIONS ON A FIBER CHANNEL ARBITRATED LOOP, SCSI BUS OR SWITCH FABRIC CONFIGURATION

SEQUENCE LISTING

Not Applicable.

CROSS-REFERENCE TO RELATED APPLICATIONS

Not Applicable.

STATEMENT REGARDING FEDERALLY SPONSORED RESEARCH OR DEVELOPMENT

Not Applicable.

MICROFICHE APPENDIX

Not Applicable.

BACKGROUND OF THE INVENTION (1) Field of the Invention

This invention relates to systems in which multiple controllers are used to control an array of storage devices.

(2) Description of Related Art Including Information Disclosed Under 37 CFR 1.97 and 37 CFR 1.98

The acronym RAID refers to systems which combine disk drives for the storage of large amounts of data. In RAID systems the data is recorded by dividing each disk into stripes, while the data are interleaved so the combined storage space consists of stripes from each disk. RAID systems fall under 5 different architectures, plus one additional type, RAID-0, which is simply an array of disks and does not offer any fault tolerance. RAID 1–5 systems use various combinations of redundancy, spare disks, and parity analysis to achieve conservation reading and writing of data in the face of one and, in some cases, multiple intermediate or permanent disk failures. Ridge, P. M. *The Book Of SCSI: A Guide For Adventurers*. Daly City Cal. No Starch Press. 1995 p. 323–329. In this application, a RAID system consisting of one host computer, one controller, and an array of multiple channels, each channel consisting of several direct access storage devices in serial electrical connection, will be termed a "single RAID subsystem".

Conventional RAID systems guard against failure of a controller by the active-active system. This system consists of two single RAID subsystems, each with a host computer, a controller, and an array of direct access storage units. The direct access storage units, in the most common case, disks, are arranged in channels in which the disks are connected in a series. A common arrangement is for one controller to control six channels of five disks in each channel. In the active-active system, each channel of one system is connected electrically to another channel in another system. This means that, in the event of the failure of one controller, the other controller can serve all 10 disks in each "double" channel. Unfortunately, during normal operation when both controllers are operating there is interference associated with the fact that two controllers are simultaneously accessing a double channel of ten disks. This interference reduces the speed of a normally acting active-active system to about 130% of the speed of a single RAID subsystem rather than the 200% of a single RAID subsystem expected from the operation of two single RAID subsystems.

U.S. Pat. No. 5,768,623 discloses a system for storing data for several host computers and several storage arrays which are linked so that each storage array can be accessed by any host computer. The system uses single-ported disks and Serial Storage Architecture (SSA) in a SSA disk array loop. Messages and data can travel either clockwise or counter-clockwise when traversing the loop. The bandwidth of such a loop is necessarily lower than that of a fibre channel configuration.

U.S. Pat. No. 5,812,754 discloses a RAID system which uses a fibre channel arbitrated loop to connect host computers and controllers as well as a separate fibre channel arbitrated loop to connect controllers and storage disks. In addition, a port bypass circuit is connected to each component in order to allow bypassing of any failed component so the operation of the loop is not affected by the failed component. Finally, in one embodiment, a star coupled RAID system with orthogonal data striping is described. In this embodiment defective components can be removed physically from the system. This system is considerably more expensive and slower in operation than the system of the present invention.

The RAID systems of the prior art do not provide the advantages of the present invention, that of inexpensively increasing the overall speed of N same-speed single RAID subsystems to N times the speed of a single RAID system under normal conditions while providing for the sharing of multiple storage devices during conditions in which a host computer or storage array controller fails. The present system maintains the high overall speed under normal conditions and provides host computer and controller redundancy without the expense of a switching system connecting the channels of storage devices and while taking advantage of the high speed associated with fibre channel loops and switch fabric configurations.

The system of the present invention is unlike the conventional active-active system because it uses a high bandwidth fibre channel arbitrated loop or switch fabric to connect the host computers and controllers. This provides redundancy in the case of any single computer or controller failure. In addition, since the present invention includes dual-ported storage devices, the failure of a storage device does not have a disruptive effect on the system. Each storage array controller (SAC) is designated a primary SAC for an array of storage units and as a secondary SAC for a different array of storage units. Each array of storage units is assigned to a primary SAC, which normally controls the array, and to a secondary SAC, which assumes the identity of the primary SAC upon failure of the primary SAC. Under normal conditions, each SAC controls only the array of storage units that it serves as primary SAC. Both the primary SAC and the secondary SAC are connected by separate loops to separate ports on the dual-ported storage devices. The combination of one primary SAC, its storage device array, and one secondary SAC which is potentially able to control the storage device array is termed a "storage array set".

If three same speed single RAID subsystems are included, for example, the system functions at 300% the speed of a single RAID subsystem during the vast preponderance of the time when all of the host computers and SACs are functioning properly. In the case of a storage array controller or associated host computer failure, however, an intact host computer and SAC (the secondary SAC of the defective storage array set) takes over the operation of the failed system's array of storage devices. The intact secondary SAC assumes the identify or address of the failed controller and retains its own identity and duties to serve its own storage device array as the primary SAC. In this way, the intact system can address its own storage devices as well as those of the failed host computer or controller. In this configuration the system has the speed expected of a conventional active-active system, after a host computer or SAC failure, about 100% of the speed of an individual RAID subsystem for the two affected single RAID subsystems. Any remaining unaffected single RAID subsystems continue to operate at the unhindered maximum speed.

The fibre channel loop and switch fabric configuration are becoming the industry standards for loop or serial interfaces, and SCSI has long been the industry standard for bus or parallel interfaces. The present invention is applicable for either the fibre channel disk array loop or SCSI interfaces for the host computers and SACs. In addition, the present invention is applicable to a switch fabric configuration.

BRIEF SUMMARY OF THE INVENTION

The redundant RAID system of this invention extends the protection of the operation of a RAID system from providing for disk failure to providing for host computer or SAC failure. The invention comprises two or more (N) single RAID subsystems which are linked by a very wide bandwidth fibre channel loop or switch fabric configuration. Each SAC is designated a primary SAC for an array of storage devices to which it is linked by a loop connection to one port on each device. A second port on each device is used to link in a loop to a secondary SAC. The primary SAC normally controls the array of storage devices. In the event of failure of the primary SAC or associated host computer, the failure is detected by the secondary SAC, which then assumes the identity of the primary SAC, learns the identity and location of the affected array of storage devices, and serves this array as though it were the primary SAC.

Thus the system normally functions as (N) independent single RAID subsystems and functions at the speed of one single RAID subsystem multiplied by N if the single RAID subsystems all have the same speed. If the speed of the single RAID subsystems vary, the system normally functions at a speed which is the sum of the single RAID subsystems. In the event of a host computer or primary SAC failure, the secondary SAC controls a double set of storage array devices. This causes interference in transmission of data to the storage devices and slows the speed of the system. The functioning controller thus takes over the function of the disabled controller and provides continuing service, albeit at a reduced speed. The unaffected single RAID subsystems of the redundant RAID system of this invention continue to function unhindered.

In the normal operating mode the present invention enables each SAC to communicate with a set of disks independently of any other SAC, thus operating the redundant RAID system at the speed of N single RAID subsystems. In the event of failure of the host computer or SAC of a component single RAID subsystem, the system automatically assumes the configuration of a conventional active-active system with respect to the affected single RAID subsystem and an unaffected single RAID subsystem. The redundant RAID system continues to operate with access by the functioning RAID subsystem host SAC to all of the disks of both the failed and the functioning SAC, although at a reduced speed.

A host computer and SAC redundant RAID system with a normal speed much higher than the conventional active-active host computer and SAC redundant systems is provided by this invention. In the event of failure of a host computer or SAC the speed of the system is no lower than that of a conventional host computer and storage array controller redundant system. If greater than two single RAID subsystems are included in the redundant RAID system, the speed of the system under nearly all conditions is greater than the conventional redundant system.

The objective of this invention is to provide a host computer and SAC redundant RAID system which continues to operate despite the failure of a single host computer or SAC.

Another objective of this invention is to provide a N host computer and SAC redundant RAID system which operates at the speed of N single RAID subsystems if all have the same speed in the absence of failures, yet provides protection against host computer or SAC failure.

Another objective of this invention is to provide a N host computer and N SAC redundant RAID system which continues to operate at a reduced speed during a host computer or SAC failure while the system continues to operate at the speed of N−1 single RAID systems if all subsystems have the same speed.

Another objective of this invention is to provide a N host computer and SAC redundant RAID system which continues to operate as long as fewer than or equal to N/2 of the single RAID subsystems suffer a failure of the host computer or SAC and each single RAID subsystem with a failed host computer or SAC is linked to an intact secondary SAC.

Another objective is to provide a redundant RAID system with two-ported storage devices each of which is connected to both a primary SAC and to a secondary SAC.

Another objective is to provide a redundant RAID system in which fibre channel or switch fabric technology is used to maximize the speed of the system.

A final objective of this invention is to provide a host computer and SAC redundant RAID subsystem which is inexpensive, resistant to failure, easy to maintain, and is without harmful effects on the environment.

BRIEF DESCRIPTION OF THE SEVERAL VIEWS OF THE DRAWINGS

FIG. 6 is a flow chart of the process of operation of the redundant RAID system of the present invention.

DETAILED DESCRIPTION OF THE INVENTION

Figure 1:
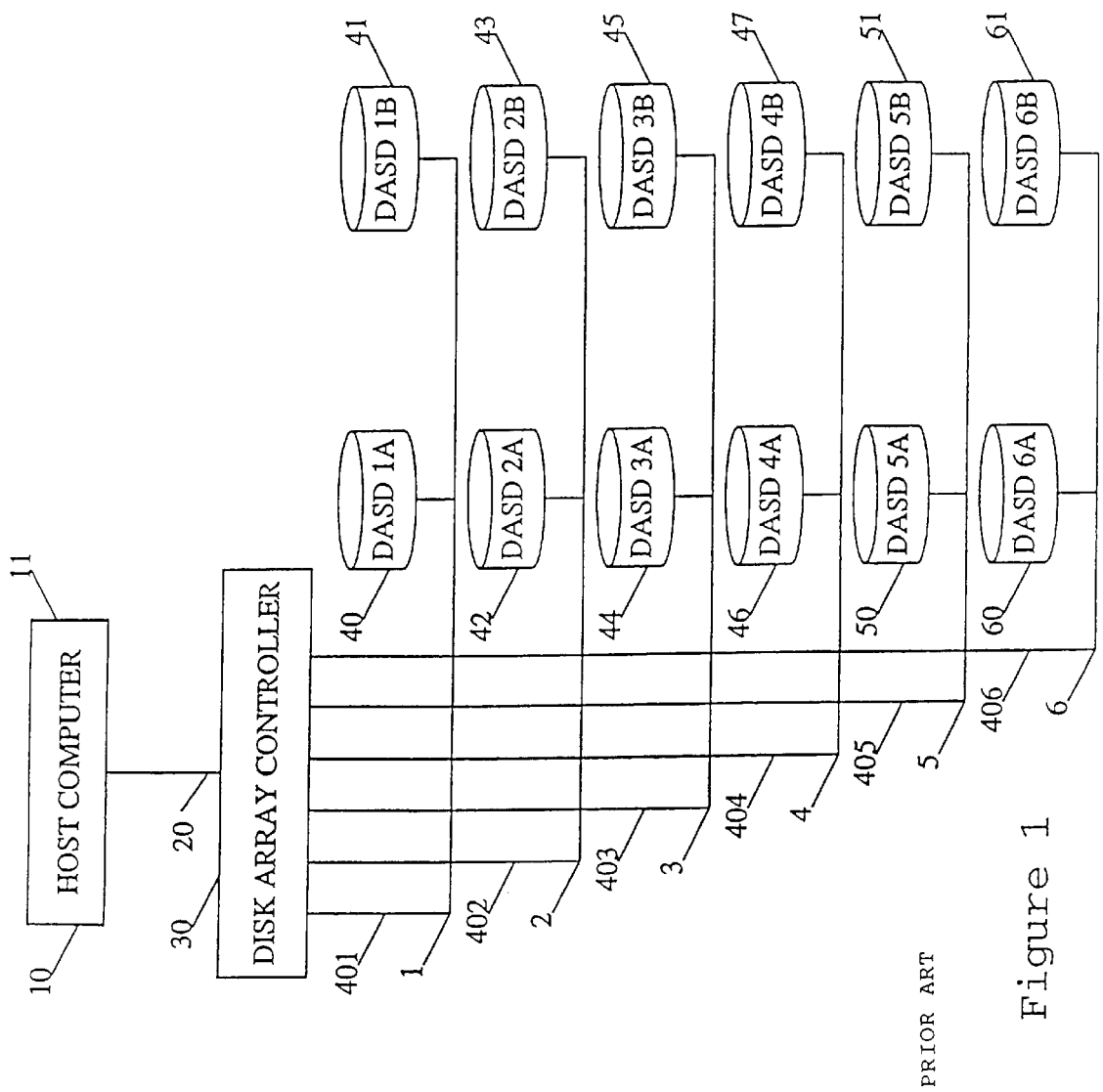
FIG. 1 is a diagrammatic representation of a single prior art RAID subsystem.

FIG. 1 is a schematic of the external view of a RAID system referred to in this application as a "single RAID subsystem". The single RAID subsystem comprised a single host computer 10, a SAC 30, and an array of direct access storage devices (DASD). The host computer 10 is electrically connected to the disk array controller 30 by connector means 20.

The connector means may be a wire or cable connector or a SCSI bus.

In all of the FIGS. the convention is followed of depicting connectors which are not electrically connected as lines which cross perpendicularly. An electrical connection is indicated by a line which terminates perpendicularly at another line or at a symbol for a component. Thus in FIG. 1 the host computer 10 is electrically connected to disk array controller 30 by connector 20. Connector 401 is electrically connected to disk array controller 30 and to DASD 1A 40 and to DASD 1B 41 but is not electrically connected to connectors 402 to 406.

DASD may be disks, tapes, CDS, or any other suitable storage device. A preferred DASD is a disk.

All the DASD and connectors in a system taken as a whole is referred to as an "array" of DASD. The DASD are arranged in channels which consist of a number of DASD which are electrically connected to each other and to the disk array controller by connector means. The channels are designated in FIG. 1 as 1 to 6. The number of channels may vary. A preferred number of channels is 6.

A channel, for example channel 1, consists of connector 401, DASD 1A 40, and DASD 1B 41. Although only two DASD are depicted in channel 1 of FIG. 1, there may be as many as 126 DASD in a channel. A preferred number of DASD in a channel is five.

A group of DASDs served by separate channels across which data is striped is referred to as a "tier" of DASDs. A DASD may be uniquely identified by a channel number and a tier letter, for example DASD 1A is the first disk connected to channel 1 of the controller.

A preferred SAC 30 is the Z-9100 Ultra-Wide SCSI RAID controller manufactured by Digi-Data Corporation, Jessup, Md.

Additional tiers of DASDs may be used.

Any suitable host computer 10 may be used. A preferred host computer 10 is a Pentium-based personal computer available from multiple vendors such as IBM, Research Triangle Park, North Carolina; Compaq Computer Corp, Houston, Tex., or Dell Computer, Austin, Tex.

Figure 2:
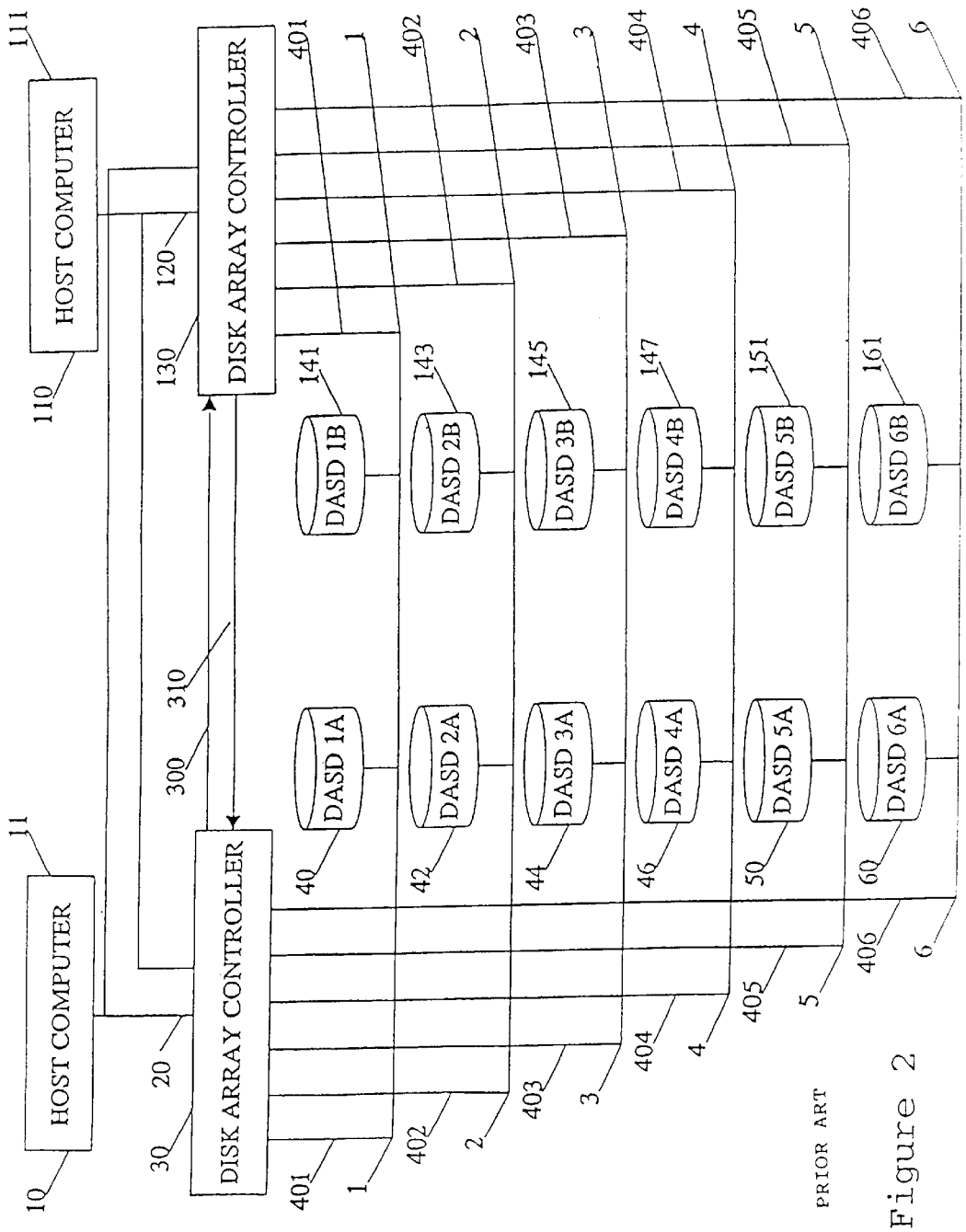
FIG. 2 is a diagrammatic representation of a conventional prior art active-active RAID system with two controllers and two host computers.

FIG. 2 shows the prior art active-active redundant host computer and SAC RAID system. This system comprises two single RAID subsystems of FIG. 1, system 11 and system 111 in FIG. 2 which are electrically connected through the disk array controllers and through the arrays of DASD.

FIG. 2 shows system 11 which comprises host computer 10, connected by connector 20 to disk array controller 30, and the system 11 array of which channels 1 to 6 consisting of connectors 401 to 406, respectively, and associated DASD 40–60, respectively. Only one DASD of each channel is depicted on FIG. 2.

FIG. 2 also shows system 111 which comprises host computer 110, connected by connector 120 to disk array controller 130, and the system 111 array of which channels 1 to 6 consisting of connectors 401 to 406, respectively, and associated DASD 141–161, respectively. Only one DASD of each channel in system 11 is depicted on FIG. 2. Note that in both system 11 and system 111 the arrays are electrically connected bidirectionally to each system. For example, array 1 of system 11 is connected by connector 401 to array 1 of system 111.

The disk array controller 30 of system 11 is connected to the disk array controller 130 of system 111 by a bidirectional connector which is depicted in FIG. 2 as connectors 300 and 310. Disk array controller 30 contains internal software which generates a binary signal termed a "normal operating signal" or a "heartbeat" at an interval of a few milliseconds when the disk array controller 30 and host computer 10 of subsystem 11 are operational. When the host computer or disk array controller is in a defective condition, the emission of the normal operating signal ceases.

The normal operating signal is emitted from disk array controller over connector 300 to the disk array controller 130 of subsystem 111. Similarly, when the host computer 110 and disk array controller 130 of subsystem 111 are operating normally, a normal operating signal is emitted from disk array controller 130 over connector 310 to disk array controller 30 of subsystem 11.

When one disk array controller no longer receives the normal operating signal because the host computer or disk array controller of the other system is defective, the operational disk array controller begins to assume the tasks of the defective array of the system containing the defective component. For example, if disk array controller 30 of subsystem 11 ceases to receive a normal operating signal from disk array controller 130 of subsystem 111, disk array controller 30 will assume the control and service of not only its own DASD, 40–60 in FIG. 2, but also of the DASD of subsystem 111, 141–161. Connector 20 also connects host computer 10 with disk array controller 130. Similarly connector 120 connects host computer 110 with disk array controller 30. Connectors 20 or 120 are used to transfer information from the host computer of a single RAID subsystem which has a faulty host computer or disk array controller to the disk array controller of the functional single RAID subsystem. This protects each component of the active-active RAID system from failure of any one host computer or disk array controller and allows each DASD to be read to or written from.

Unfortunately, the protection against failure in the system of FIG. 2 is achieved at a cost in speed of operation. An interference condition is created in any channel 401–406 of FIG. 2 because two disk array controllers are using a single connector to address the DASD of two single RAID subsystems. Each disk array controller must wait until the conductor is free before addressing its DASD. The net effect is a considerable reduction of speed in normal operation. If the speed of a single RAID subsystem is 100% (relative speed), then the relative speed of the active-active system of FIG. 2 under normal operating conditions is about 130%, rather than the 200% expected of two single RAID subsystems (which, however, do not enjoy the fault-tolerance associated with the redundant host computers and disk array controllers).

Figure 3:
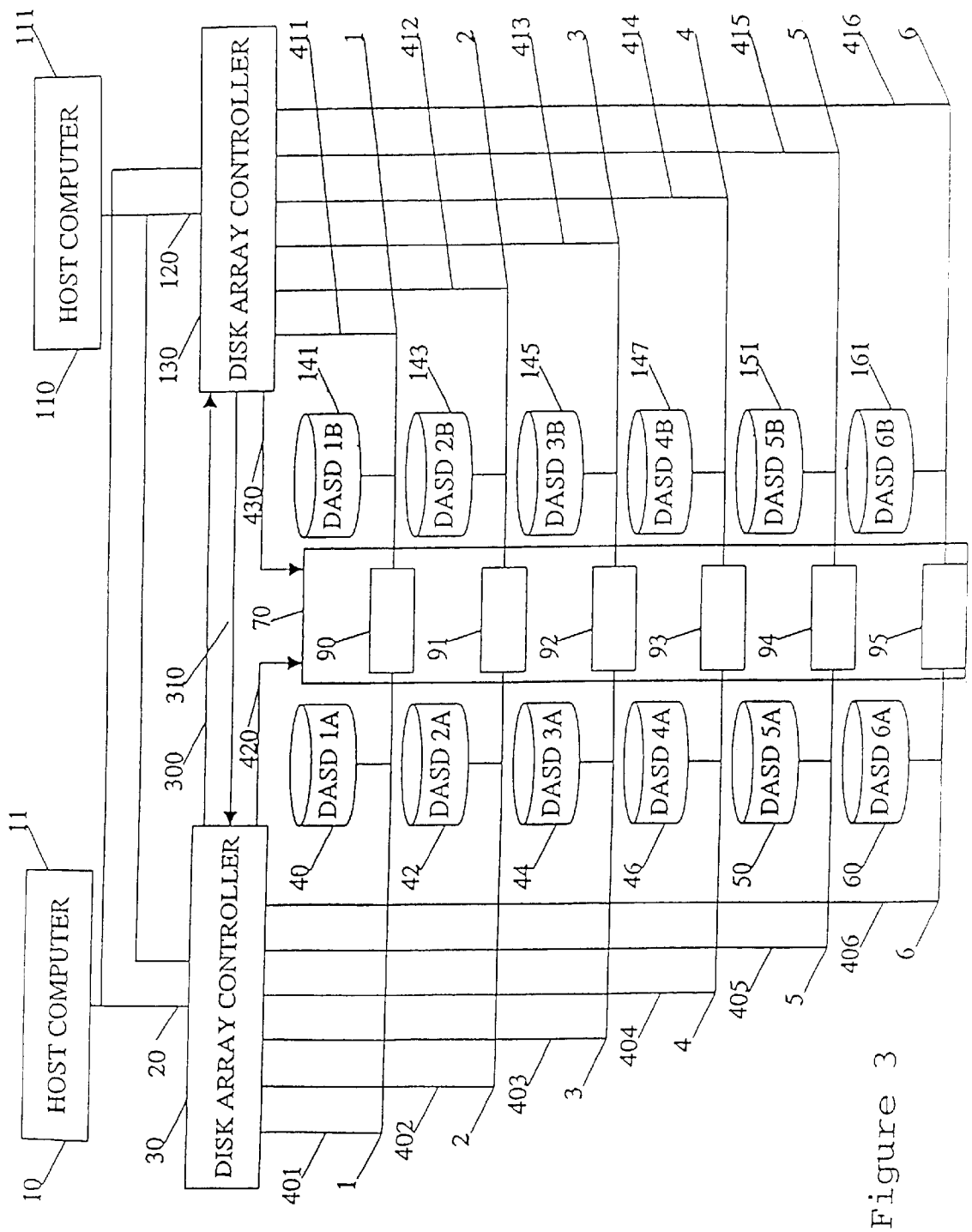
FIG. 3 is a diagrammatic representation of a FULL-SPEED ACTIVE-ACTIVE redundant RAID system which uses switches to connect arrays of storage devices.

Another redundant RAID system, termed the FULL-SPEED ACTIVE-ACTIVE redundant RAID system, is depicted in FIG. 3. This system is disclosed in U.S. patent application Ser. No. 09/192,016, filed Nov. 13, 1998, incorporated herein by reference.

The system in FIG. 3 is identical to that in FIG. 2 with the exception of the addition of a normally open switch means between the channels which are connected in FIG. 2. and the means to control the switch means. In FIG. 3 the electrical connector 401 between channel 1 of subsystem 11 and channel 1 of subsystem 111 is intercepted by controllable repeater or core 70. The core 70 consists of connections to channel 1 of subsystems 11 and 111 with normally open switch means, in this case a normally open repeater 90 electrically connected to and interposed between the segments of connector 401, which has been segmented into connector 401 and 411. When repeater 90 of core 70 is in the open position, there is no electrical connection between channel 1 of subsystem 11 and channel 1 of subsystem 111. Similarly, switch means or repeaters 91–95 are interposed in the connections between channels 2, 3, 4, 5, and 6, respectively, and while the switch means or repeater 91–95, respectively, are in the open position, there are no electrical connections between channels 2, 3, 4, 5, and 6 of subsystem 11 and channels 2, 3, 4, 5, and 6 of subsystem 111, respectively. The core 70 is a container which contains and supports the switch means and the connection means for attaching switch means to a channel.

When the switch means of the core are closed the electrical connections between the channels of subsystem 11 and subsystem 111 are formed. Under the conditions of closed switch means the system of FIG. 3 is electrically equivalent to that of the active-active system of FIG. 2.

In operation, the switch means 90–95 in core 70 are normally open while each host computer and disk array controller is functioning normally. Under these normal conditions the channels of subsystems 11 and 111 are electrically isolated from each other. The relative speed achieved by the system is 200% of the speed of a single RAID subsystem.

In the rare event of failure of one host computer or disk array controller the normal operating signal or heartbeat emitted from a disk array controller is stopped. When the other disk array controller does not receive a normal operating signal it emits a closure signal to the core. The normally open switch means are now closed and the electrical connections between the channels of the functional and non-functional systems are closed, allowing the functional system to control the DASD of both subsystems.

The present invention is designed to overcome the lack of performance associated with the active-active RAID system under normal conditions while retaining the fault-tolerance under conditions of failure of a host computer or disk array controller.

Figure 4:
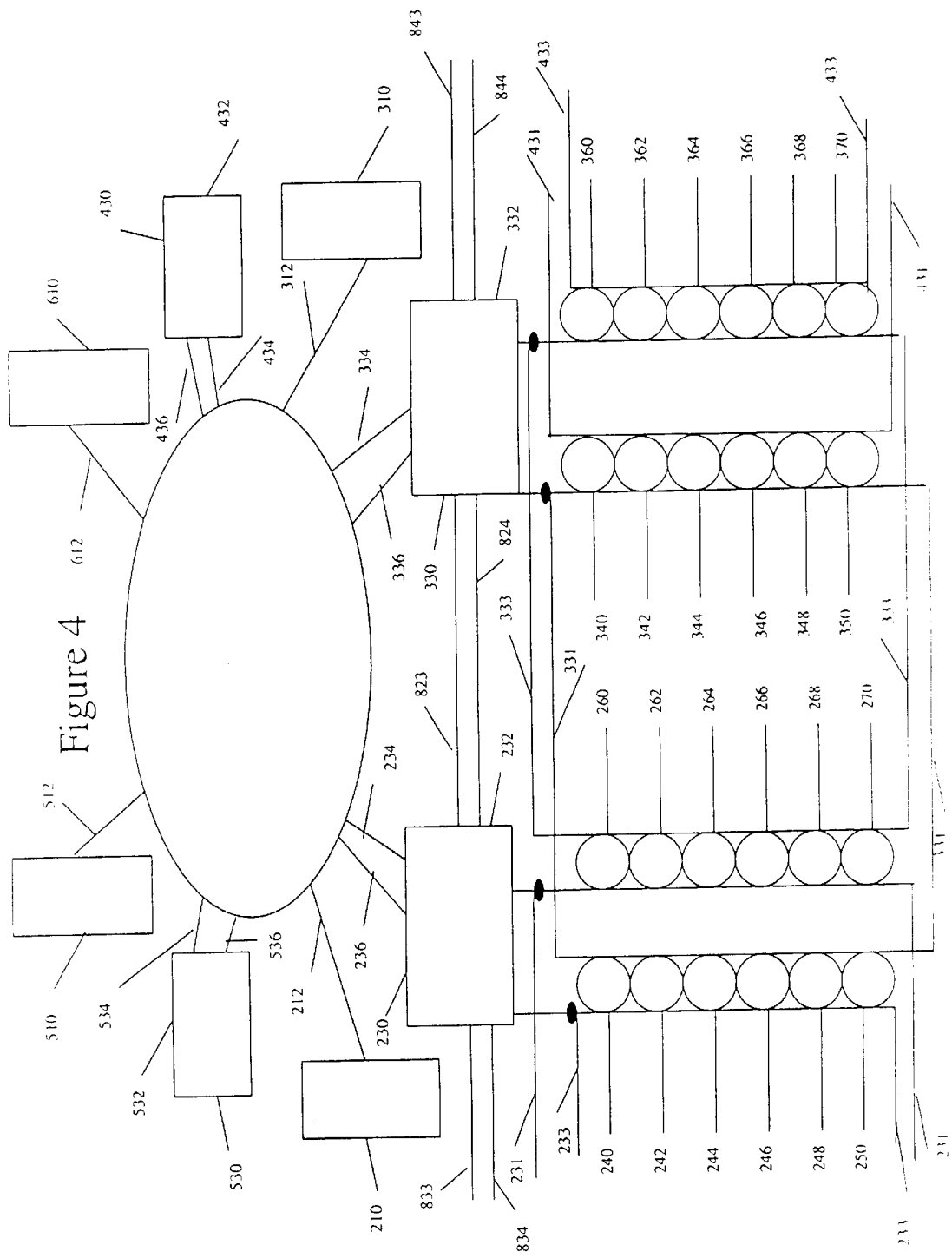
FIG. 4 is a diagrammatic representation of the FULL-SPEED ACTIVE-ACTIVE redundant RAID system of the present invention.

FIG. 4 is a diagrammatical representation of the present invention. In FIG. 4 the redundant RAID system is shown with parts of 4 single RAID subsystems. FIG. 4 shows two RAID subsystems with host computer, storage array computer (SAC) and a portion of two array of direct access storage devices (DASD). This may be extended to N subsystems, where N is a number greater than two, by the addition of single RAID subsystems. In FIG. 4, the host computers 210, 310, 510, and 610 and the SAC 230, 330, 430, and 530, and the interface chips 232, 332, 432, and 532 are connected by loop connecting means 22 by connectors 212, 312, 512, and 612; 236, 336, 436, and 536; and 234, 334, 434, and 534, respectively.

Only a portion of the DASD are shown in FIG. 4. Two channels of DASD are shown on SAC 230; and two channels of DASD are shown on SAC 330. SAC 230 is connected by connector 233 to DASD 240, 242, 244, 246, 248, and 250. SAC 230 is connected by connector 231 to DASD 260, 262, 264, 268, and 270. SAC 330 is connected by connector 331 to DASD 340, 342, 344, 346, 348, and 350. Sac 330 is connected by connector 333 to DASD 360, 362, 364, 366, 368, and 370. SAC 330 is also connected by connector 331 to DASD 240, 242, 244, 246, 248, and 250. Note that connector 331 is connected to these DASD at a connection site or port which is different from the port to which connector 233 is connected. Also, connector 331 forms a loop. SAC 330 is connected by connector 333 to DASD 260, 262, 264, 266, 268, and 270. Again a different port from that which connects connector 321 was used with these DASD and connector 333 forms a loop.

Connectors 231 and 233 which are connected to SAC 230, connect with the DASD of channels in an array which is not shown in FIG. 4. Connector 431 connects with a SAC which is not shown in FIG. 4 and also connects with DASC 340, 342, 344, 346, 348, and 350 using a port on each DASC which was not used in connecting with connector 331. Connector 433 connects with a SAC which is not shown in FIG. 4 and also connects with DASC 360, 362, 364, 366, 368, and 370.

Each SAC, 230, 330, 430 and 530, has an associated interface chip 232, 332, 432, and 532, respectively.

SAC 230 and SAC 330 are connected by connector means 824 and 823, used to deliver the heartbeat. SAC 230 is connected for this purpose to another SAC (not shown) by connector means 833 and 834. SAC 330 is connected for this purpose to another SAC (not shown) by connector means 843 and 844.

Figure 5:
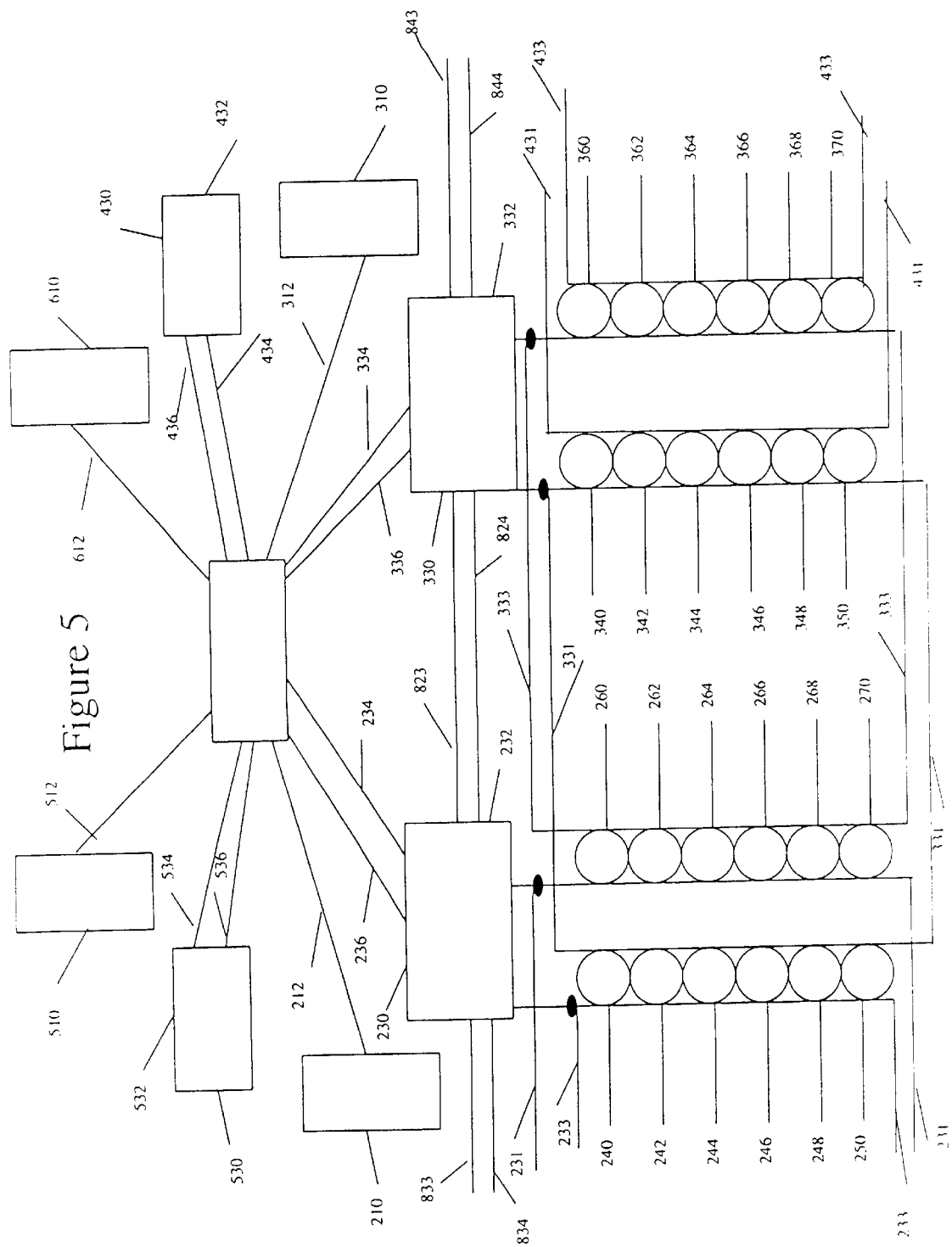
FIG. 5 is a diagrammatic representation of the embodiment of the FULL-SPEED ACTIVE-ACTIVE redundant RAID system of the present invention which incorporates a switch fabric configuration.

FIG. 5 is identical to FIG. 4 except that the loop connecting means 22 does not appear in FIG. 5. Rather, the components in FIG. 5 are connected by connecting means to a switch fabric device 24.

Loop connecting means may be a SCSI bus, fibre channel arbitrated loop, or a switch fabric device.

Fibre Channel is a high-speed low-latency communications technology with gigabit-per-second transmission rates in storage/server environments. A preferred fiber channel switch is a GigWorks MKII-16 Fibre Channel Switch, available from Ancor Communications, Inc., Minnetonka, Minn.

A switch fabric device is a distributed switch with the topology of a torroidal derivative. The system scales in a linear fashion to over a terabit per second in bandwidth. A preferred switch fabric device is CST 2000, available from ServerSwitch Corporation, Dallas, Tex.

A preferred dual-port disk is the 3.5-Inch Ultrastar2 XP, available from IBM, San Jose, Calif.

A preferred SAC is the Z-9100 Ultra-Wide SCSI RAID controller manufactured by DigiData Corporation, Jessup, Md.

Any suitable host computer may be used. A preferred host computer 10 is a Pentium-based personal computer available from multiple vendors such as IBM, Research Triangle Park, North Carolina; Compaq Computer Corp, Houston, Tex., or Dell Computer, Austin, Tex.

Connectors may be fiber optics or copper wires.

The systems of both FIGS. 4 and 5 function in an identical manner, which will be described with reference to FIG. 4. Each host computer may be associated with a specific SAC. For example, host computer 510 may provide and retrieve data from SAC 230, which then stores the data on its array of DASC, in FIG. 4, DASC 240–250 and 260 to 270 in the write mode. In the read mode, SAC 230 reads the data from the same DASC and reports the data to the host computer 510. A typical SAC has 6 channels of DASC in its array, but only two channels are shown in FIG. 4. The SAC stripes the data across the channels of DASD. When data are being read, the SAC 230 reads the data across the channels and transmits the data to the associated host computer 510.

This redundant RAID system has provisions for the failure of a SAC or associated host computer, as will be described with reference to FIG. 4. The components of the RAID system are organized into groups called "storage array sets". A storage array set consists of a primary SAC and its attached array of DASD and another SAC which is designated the secondary SAC. Since each SAC has an array of DASD, each SAC is designated a primary SAC for its own attached array and as a secondary SAC for another array of DASD. In the event of a failure of a primary SAC or its associated host computer, the secondary SAC, as a member of the storage array set, assumes the identity of the primary SAC, identifies the array of DASD in the storage array set, and controls both the array of the storage array set of which it was secondary SAC as well as its own array of DASD. This process is shown with respect to FIG. 4 as follows. Each SAC such as SAC 230 periodically emits a normally operating signal or "heartbeat" to the preferred connecting means 823 and 824, which may be copper wire or fiber optics waveguide, an I2C bus or a SCSI bus, which connects the SACs of a storage array set. In an alternative configuration, the heartbeat is emitted to the loop connecting means 22 which might be a fiber channel loop. If such a loop is used, the heartbeat signal would have to follow the established priority and arbitration procedures for use of the loop, a requirement which is avoided by use of a direct connections between the SACs. Emission of this signal ceases if there is a failure in SAC 230 or its associated host computer 510. In that case, the emission of the heartbeat by SAC 230 ceases. Under those circumstances, the secondary SAC of the storage array set of which SAC 230 is primary SAC, in this case SAC 330, detects the absence of heartbeat from SAC 230. SAC 330 then uses its interface chip 332 to assume the identity of SAC 230, so that instructions and requests which are directed to SAC 230 are intercepted by SAC 330. A table of addresses for each DASD in the entire system has been placed on each DASD. Alternatively, this information can be stored in each SAC in a nonvolatile memory. SAC 330 then surveys DASD until it finds the table, and determines the identity of the array of DASD for which SAC 230 was primary SAC. SAC 330 then serves this array (as well as its own array) of DASD. The second embodiment of FIG. 5 functions in exactly the same manner except the loop connecting means is replaced by a switch fabric chip.

This process is diagramed in FIG. 6. The failure of a primary SAC or associated host computer halts the emission to the connecting means of the heartbeat by the primary SAC 700. In addition, the writing or reading of data ceases in the storage array of the affected storage array set. The secondary SAC of the affected storage array set notes the cessation of the heartbeat emitted by the primary SAC 710. Using its associated interface chip, the secondary SAC assumes the identity of the primary SAC 720. The secondary SAC also identifies the DASD of the affected storage array set by reading a table of DASD addresses and SAC assignments previously stored on each DASD and identifies the DASD of the affected storage array set 730. Finally, the secondary SAC controls the DASD of the storage array set 740.

In this way, the redundant RAID system functions despite the loss of a host computer or SAC. It will continue to function in the face of failure of more than one SAC or host computer, so long as each storage array set has one functioning secondary SAC. Additional redundancy and stability is achieved by the practice of copying a table of DASC addresses and SAC assignments on each DASD of the system. This insures the availability of the information despite the failure of several DASD. In addition, the placement of the table on DASDs is more immediate, more certain, and more reliable than putting the table on a SAC, which would require the use of the arbitrated loop for communication of the table.

At least two storage array controllers are required for this invention although any number of host computers greater than two may be used. Since the host computers and the storage array controllers are connected electrically through the loop connecting means, there is no physical attachment of host computer and storage array controllers.

It will be apparent to those skilled in the art that the examples and embodiments described herein are by way of illustration and not of limitation, and that other examples may be used without departing from the spirit and scope of the present invention, as set forth in the claims.

We claim:

1. A redundant RAID system comprising:

N host computers and M storage array controllers (SACs), each host computer and each SAC linked to each other host computer and each other SAC by loop connecting means, each having a unique address, and each able to communicate with each member of the loop, wherein N is greater than M, and M is equal to or greater than 2;

each host computer associated with one SAC and each SAC connected to an array of storage units comprising one or more channels of storage units, each channel of storage units having a multiplicity of storage units, each storage unit having dual ports, by a loop connector using one port on each storage unit, and controlling these storage units as primary SAC;

each SAC also connected to another array of storage units, each storage unit having dual ports, by another loop connector using a second port, and able to control these storage units as secondary SAC;

each array of storage units thereby controlled by a primary SAC and potentially controlled by a secondary SAC;

an array of storage units, the combination of an array's primary SAC, secondary SAC and array of storage units termed a storage array set;

whereby each SAC is a member of two storage array sets, as primary SAC of a first storage array set, and as secondary SAC of a second storage array set;

an interface chip attached to each SAC, each interface chip also connected to each host computer and to each SAC by loop connecting means, each interface chip able to assess the status of the SAC to which it is attached and associated host computer or host computers, and able to communicate with the secondary SAC of its storage array set;

each secondary SAC able to assume the identity of the primary SAC of its storage array set in the event of the failure of the primary SAC of its storage array set or failure of the associated host computer or computers;

whereby the failure of the primary SAC of a storage array set or associated host computer causes the secondary SAC of the storage array set to assume the control of the array of storage units of the storage array set.

2. The system of claim 1 wherein the loop connecting means is a fiber channel arbitrated loop or a SCSI bus.

3. The system of claim 1 wherein the loop connecting means is a switch fabric device.

4. The system of claim 1 wherein the storage units are disks, tapes, or CDS.

5. The system of claim 4 wherein the storage units are disks.

6. The system of claim 1 wherein the loop connecting means connecting each SAC with an array of storage units is an IDE, EIDE, SCSI bus, Fibre Channel interface, or switch fabric interface.

7. The system of claim 6 wherein the loop connecting means connecting each SAC with an array is a SCSI bus.

8. The system of claim 1 wherein the loop connecting means connecting each interface chip and each host computer and each SAC is a fibre channel arbitrated loop or a SCSI bus.

9. The system of claim 1 wherein the loop connecting means connecting each interface chip and each host computer and each SAC is a switch fabric device.

10. The system of claim 1 further comprising:

a table on each storage device containing the address and configuration of each storage device of the system, for use by a secondary SAC in assuming the identity of a failed primary SAC in order to control the storage unit array of the storage unit set.

11. The system of claim 1 further comprising:

a table in the memory of each SAC containing the address and configuration of each storage device of the system, or use by a secondary SAC in assuming the identity of a failed primary SAC in order to control the storage unit array of the storage unit set.

* * * * *